(12) United States Patent
Ocke et al.

(10) Patent No.: US 8,307,338 B2
(45) Date of Patent: Nov. 6, 2012

(54) CONVERTING RULES IN A RULE-BASED SYSTEM TO ONTOLOGICAL INFORMATION

(75) Inventors: Kirk J. Ocke, Ontario, NY (US); Dale E. Gaucas, Penfield, NY (US); Michael D. Shepherd, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1254 days.

(21) Appl. No.: 12/060,491

(22) Filed: Apr. 1, 2008

(65) Prior Publication Data

US 2009/0249294 A1   Oct. 1, 2009

(51) Int. Cl.
*G06F 9/44* (2006.01)
(52) U.S. Cl. ........................ 717/117; 717/123
(58) Field of Classification Search .................. None
See application file for complete search history.

(56) References Cited

U.S. PATENT DOCUMENTS

| 7,580,871 | B2 * | 8/2009 | Brunner et al. ............. 705/26.5 |
| 2005/0234957 | A1 * | 10/2005 | Olson et al. .................. 707/101 |
| 2006/0242002 | A1 | 10/2006 | Sun et al. |
| 2007/0094200 | A1 | 4/2007 | Ocke |
| 2009/0089174 | A1 | 4/2009 | Brunner et al. |
| 2009/0141302 | A1 | 6/2009 | Balm et al. |

OTHER PUBLICATIONS

Shepherd et al., U.S. Appl. No. 12/034,762, Notice of Allowance, Aug. 31, 2011, 5 pages.

* cited by examiner

*Primary Examiner* — Li B Zhen
*Assistant Examiner* — Evral Bodden
(74) *Attorney, Agent, or Firm* — Gibb & Riley, LLC

(57) ABSTRACT

A method and system provides one or more product type descriptions, and constructs a map between the sub-conditions of the product type descriptions and constructs in a Web Ontological Language (OWL). The method converts the product type description rules into new OWL classes by creating a new OWL class for each corresponding rule; adding the new OWL class to the OWL ontology; for each condition of the corresponding rule, extracting sub-conditions; for each the sub-condition extracted; creating new constructs for the new OWL class using the map; and adding new class restrictions to the new OWL class, wherein each of the new class restrictions relates to a corresponding condition of the corresponding rule.

16 Claims, 7 Drawing Sheets

CONVERTING RULES IN A RULE-BASED SYSTEM TO ONTOLOGICAL INFORMATION

BACKGROUND AND SUMMARY

Embodiments herein generally relate to product types used in a workflow system, and more particularly to a system and method that provide product type description rules, construct a map between the conditions of the product type description rules and constructs in a Web Ontological Language (OWL), and which converts the rules into new OWL classes.

In existing workflow systems, product descriptions (e.g., JDF® Product Intent) can be automatically classified into a product type or product class (e.g., Business Card) using a rules-based system. As workflow systems become more dynamically configurable, the addition of new product types and the rules to classify product descriptions into the new product type provides for increased sophistication and complexity of the classifier.

For example, as described in U.S. Patent Publication 2006/0242002, the complete disclosure of which is incorporated herein by reference, the JDF® (Job Definition Format) is an industry standard designed to simplify information exchange between different applications and systems in and around the graphic arts industry. One product that uses JDF® is called Xerox FreeFlow Process Manager available from Xerox Corporation, Norwalk, Conn., USA) which uses a technology called "Intent2Process" that converts JDF Product Intent into JDF Process. JDF® is a registered trademark of the International Cooperation for the Integration of Processes in Prepress, Press and Postpress Organization (CIP4) Zurich, Switzerland and specifies the information required to complete a customer intended print job. JDF® is a comprehensive XML-based file format and proposed industry standard for end-to-end job ticket specifications combined with a message description standard and message interchange protocol.

Generally, the information in JDF® is separated into two categories. JDF Process is organized into nodes in a tree where the nodes represent print-related processes. The process nodes include resources that the process produces and consumes. The second category of JDF is JDF Product Intent which describes the finished print product (such as a Book). An XML-based JDF® job describes the status of processes and resources at a particular instance. An MIS (Management Information System) is responsible for estimating, tracking, controlling and monitoring the entire production workflow.

Thus, JDF® allows XML-based description of all the processes needed to complete a print product, from job submission through prepress, press and post press. Each process is defined in terms of the consumed input resources and produced output resources. Resources produced by one process might be required by other processes, and processes are interconnected in a chain of processes to form a complete workflow. Processes may share resources and be interconnected in sequential, parallel, overlapping and iteration fashion.

The embodiments herein can use an application, such as JDF®, within any apparatus, such as a copier, multifunction machine, printer, or other printing apparatus. Such a printing apparatus includes interconnected items such as a printing device (or printing engine), a processor, a storage device, etc. The storage device is adapted to maintain a rule base having a set of defined product types (such as print product types) into which product descriptions (e.g., print product descriptions) are classified, wherein each defined print product type is comprised of one or more rules, each of the rules has one or more conditions to be satisfied and an action to be taken if the conditions are satisfied. Each of the conditions is made up of one or more sub-conditions and the sub-conditions have one or more elements.

The method constructs a map between such sub-conditions and "constructs" in a Web Ontological Language (OWL). The OWL comprises an ontology that is made up of one or more classes. These classes correspond to the rules of the product descriptions mentioned above. Each of the classes of the OWL comprises one or more class restrictions (corresponding to the conditions mentioned above). Each of the class restrictions has one or more constructs (corresponding to the sub-conditions mentioned above).

The method converts the above rules into new OWL "classes." To perform this conversion, the method creates a new OWL class for each corresponding rule and adds this new OWL class to the OWL ontology. For each condition of the corresponding rule, the method extracts sub-conditions and for each sub-condition extracted, the method creates new constructs for the new OWL class using the previously created map between the sub-conditions and the constructs. This process of creating new constructs can be based on additional logic and additional mappings.

Further, the method adds new class restrictions to the newly created OWL class, wherein each of the new class restrictions relates to a corresponding condition of the rule being converted. When adding the new class restrictions, for each given condition, the method creates a conjunction of all the new constructs associated with sub-conditions of the given condition. Thus, the conjunction of all the constructions forms the new class restriction corresponding to the given condition.

Next, after so converting the rules to the OWL classes, the method outputs the newly created OWL classes and can perform automated reasoning on the new OWL classes to identify relationships between the new OWL classes (and corresponding relationships between the rules). Therefore, by converting the rules to OWL, the embodiments herein allow relationships between the rules that otherwise might be unknown to be easily discovered.

The product descriptions can comprise print product descriptions and, similarly, the product type description rules that classify a product description can be print product type description rules that classify print product descriptions when the conditions are satisfied. Thus, the foregoing method can be used within any product description system, such as a printing apparatus, that can comprise any type of printing device, such as a printer, copier, facsimile machine, multi-function machine, etc.

Such a system can include a processor (and a printer, if it is a printing apparatus). Any such a printing engine is operatively connected to the processor and the printing engine is adapted to print markings on items. In addition, a computerized storage device (tape, hard drive, electronic memory, etc.) is operatively connected to the processor and adapted to maintain one or more print product descriptions. For a printing apparatus, the print product type descriptions comprise one or more printing rules, and each of the printing rules comprises one or more conditions to be satisfied, as well as a printing action to be taken by the printing engine if the conditions are satisfied. As mentioned above, each of the conditions comprises one or more sub-conditions.

A mapping engine is also operatively connected to the processor. The mapping engine is adapted to construct the map between the sub-conditions and constructs in a Web Ontological Language (OWL). Further, such an apparatus includes a converter adapted to convert the printing rules into new OWL classes. Thus, the converter performs the conversion process mentioned above that, for a printing apparatus includes creating a new OWL class for each corresponding printing rule; adding the new OWL class to the OWL ontology; for each condition of the corresponding printing rule, extracting sub-conditions; for each the sub-condition extracted, creating new constructs for the new OWL class using the map; and adding new class restrictions to the new OWL class, wherein each of the new class restrictions relates to a corresponding condition of the corresponding printing rule. The creating of the new constructs can be further based on additional logic and additional mappings maintained within the computerized storage device.

The apparatus also includes an interface operatively connected to the processor, the interface being adapted to receive instructions to initiate operations of the mapping engine and the converter, and to output the new OWL classes. In addition, the apparatus can include an automated reasoning engine (also operatively connected to the processor). After converting the printing rules to the OWL, the automated reasoning engine is adapted to perform automated reasoning on the new OWL classes to identify relationships between the new OWL classes and corresponding relationships between the printing rules.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
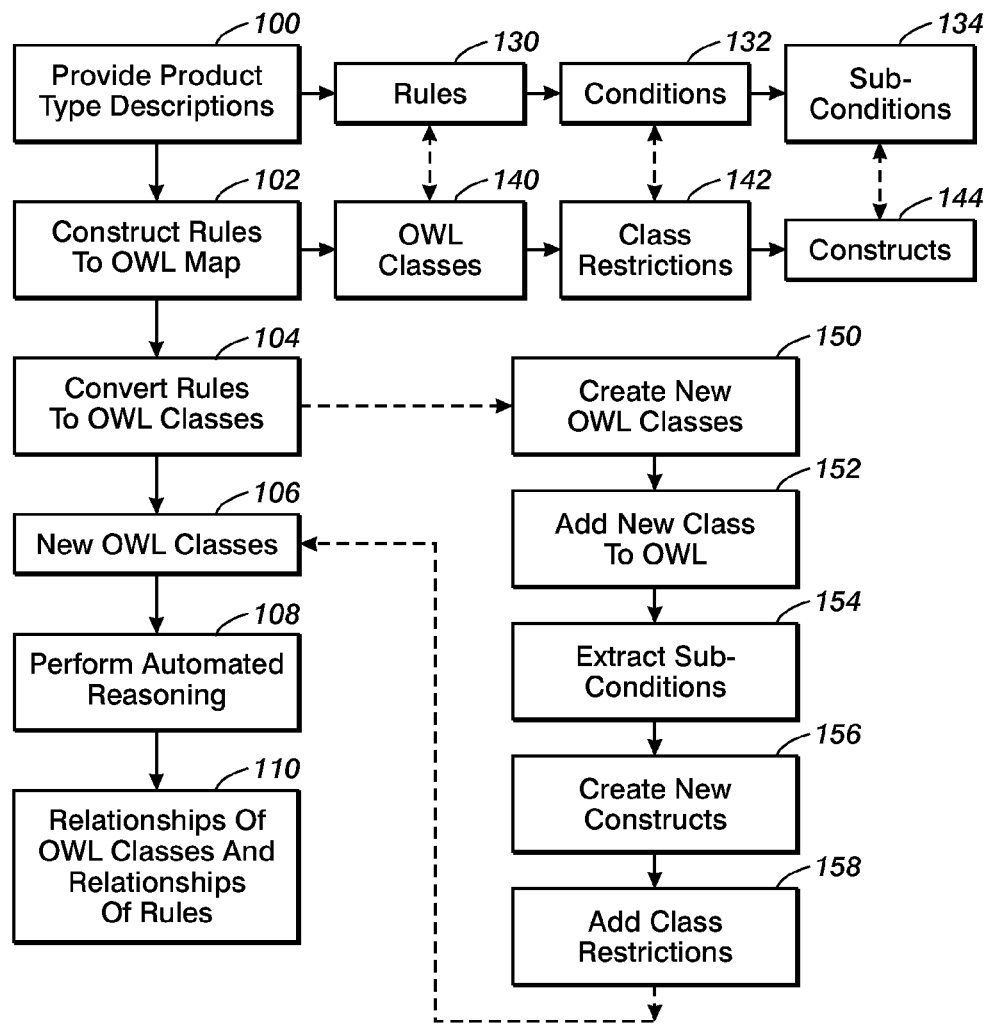
FIG. 1 is a schematic diagram illustrating embodiments herein.

As mentioned above, the Xerox JDF® Intent2Process conversion system is a rules-based system that automatically transforms JDF® Product Intent (a product description) into a process network that can be used to manufacture the desired product. For example, a JDF® Product Intent representing a "business card" can be automatically transformed into an imposition process followed by a print process that can be executed to manufacture the business cards. In addition, progresses in Web related technologies have brought about more advances which provide for improved automated processing of computing resources, including the capability to act on metadata and semantic representations. Knowledge-bases are created to include taxonomies (classes & properties), logical assertions, instances of defined classes, and datatype expressions in which automated reasoning systems use description logic to infer new and expanded knowledge from the provided conditions and assertions. For example, one open-source reasoner, Pellet® available from Clark & Parsia, LLC, Washington, D.C., U.S.A., is a commonly used inferencing engine.

As discussed above, embodiments herein provide a system and method of converting a rule-base into ontological information (for example, in the form of a Web Ontological Language (OWL)), such that automated reasoning can be used to analyze the rule-base for non-obvious relationships between the rules.

The Web Ontology Language (OWL) is a family of knowledge representation languages for authoring ontologies. An OWL ontology is a set of axioms which place constraints on sets of items (called "classes") and the types of relationships permitted between them. These axioms provide semantics by allowing systems to infer additional information based on the data explicitly provided. Some existing OWL ontologies may be browsed using an editor such as Protégé-OWL.

Protégé is a free, open-source platform that provides its community of users with a suite of tools to construct domain models and knowledge-based applications with ontologies. At its core, Protégé implements a rich set of knowledge-modeling structures and actions that support the creation, visualization, and manipulation of ontologies in various representation formats. Information regarding Protégé is available from the Stanford Center for Biomedical Informatics Research, Palo Alto, Calif., USA.

Specifically the embodiments herein provide a method that 1) converts the individual rules in a rule-base into OWL classes, and 2) converts the conditions of a given rule to additional OWL classes, properties and restrictions applicable to the OWL class for that rule.

The embodiments herein can be used in conjunction with many systems, such as the system defined in U.S. patent application Ser. No. 12/034,762, entitled "SEMANTICALLY VALIDATING PRINT PRODUCT DEFINITIONS", (the complete disclosure of which is incorporated herein by reference).

The Xerox JDF Intent2Process system uses a rule-based system to classify JDF Product Intent descriptions as a specific product type; and a similar rule-based system is used to transform JDF Intent into JDF Process. With such systems, the conditions of the various rules can be complicated, and non-obvious relationships between rules may exist. As a result, great effort is taken during development to ensure the rule-bases are correct, (e.g., that they express domain knowledge as intended and do not introduce inconsistencies or unexpected consequences). However, as described in U.S. patent application Ser. No. 12/034,762, the rule-bases can be modified by end users. Therefore, the new rules added by the users cannot be confirmed as being correct at development time.

In order to accommodate such situations, as shown in flowchart form in FIG. 1, one method embodiment herein provides one or more product type descriptions 100 made up of one or more rules 130. Each of the product type descriptions 100 has one or more rules 130, each of the rules 130 has one or more conditions 132 to be satisfied and an action to be taken if the conditions 132 are satisfied. Each of the conditions 132 is made up of one or more sub-conditions 134 and the sub-conditions 134 are made up of one or more elements connected by logical operators.

The method constructs a map between such sub-conditions 134 and "constructs" 144 in a Web Ontological Language (OWL) in item 102. The OWL comprises an ontology that is made up of one or more OWL classes 140. These OWL classes 140 correspond to the rules 130 of the product descriptions 100 mentioned above. Each of the OWL classes 140 comprises one or more class restrictions 142 (corresponding to the conditions 132 mentioned above). Each of the class restrictions 142 has one or more constructs 144 (corresponding to the sub-conditions 134 mentioned above).

The method converts (transforms) the above rules 130 into new OWL classes 140 in item 104. To perform the conversion in item 104, the method creates a new OWL class for each corresponding rule (150) and adds this new OWL class to the OWL ontology (152). For each condition of the corresponding rule, the method extracts sub-conditions (154) and for each sub-condition extracted, the method creates new constructs (156) for the new OWL class using the previously created map between the sub-conditions 134 and the constructs 144 (from item 102). This process of creating new constructs 156 can be based on additional logic and additional mappings.

Further, in item 158 the method adds new class restrictions 142 to the newly created OWL class, wherein each of the new class restrictions 142 relates to a corresponding condition of the rule being converted. When adding the new class restrictions in item 158, for each given condition, the method creates a conjunction of all the new constructs associated with sub-conditions of the given condition. Thus, the conjunction of all the constructs forms the new class restriction corresponding to the given condition.

Thus, for each condition, the method creates a class restriction by transforming the original expressions in the condition with the appropriate OWL constructs from the sub-condition to OWL construct map and additional logic (or mappings) as required. This is a transformation of one sentence in predicate calculus to an "equivalent" sentence in predicate calculus by replacing the original sub-conditions with the appropriate OWL constructs (which are defined to be semantically equivalent). Thus, this process creates a new restriction that is the conjunction of all the OWL restrictions created in step 158 and defines the OWL class with this restriction.

Next, after so converting the rules 130 to the OWL classes 140 in item 104, the method outputs the newly created OWL classes (106) and can perform automated reasoning on the new OWL classes (108) to identify and output relationships (110) between the new OWL classes (and corresponding relationships between the rules). Therefore, by converting the rules 130 to OWL, the embodiments herein allow relationships between the rules 110 that otherwise might be unknown to be easily discovered by an automated reasoner.

The product type descriptions 100 can comprise print product type descriptions and, similarly, the rules 130 can be rules that classify a product description as a print product type when the conditions 132 are satisfied. Thus, the foregoing method can be used within any product description system, such as a printing apparatus (shown in FIG. 2) that can comprise any type of printing device, such as a printer, copier, facsimile machine, multifunction machine, etc.

Figure 2:
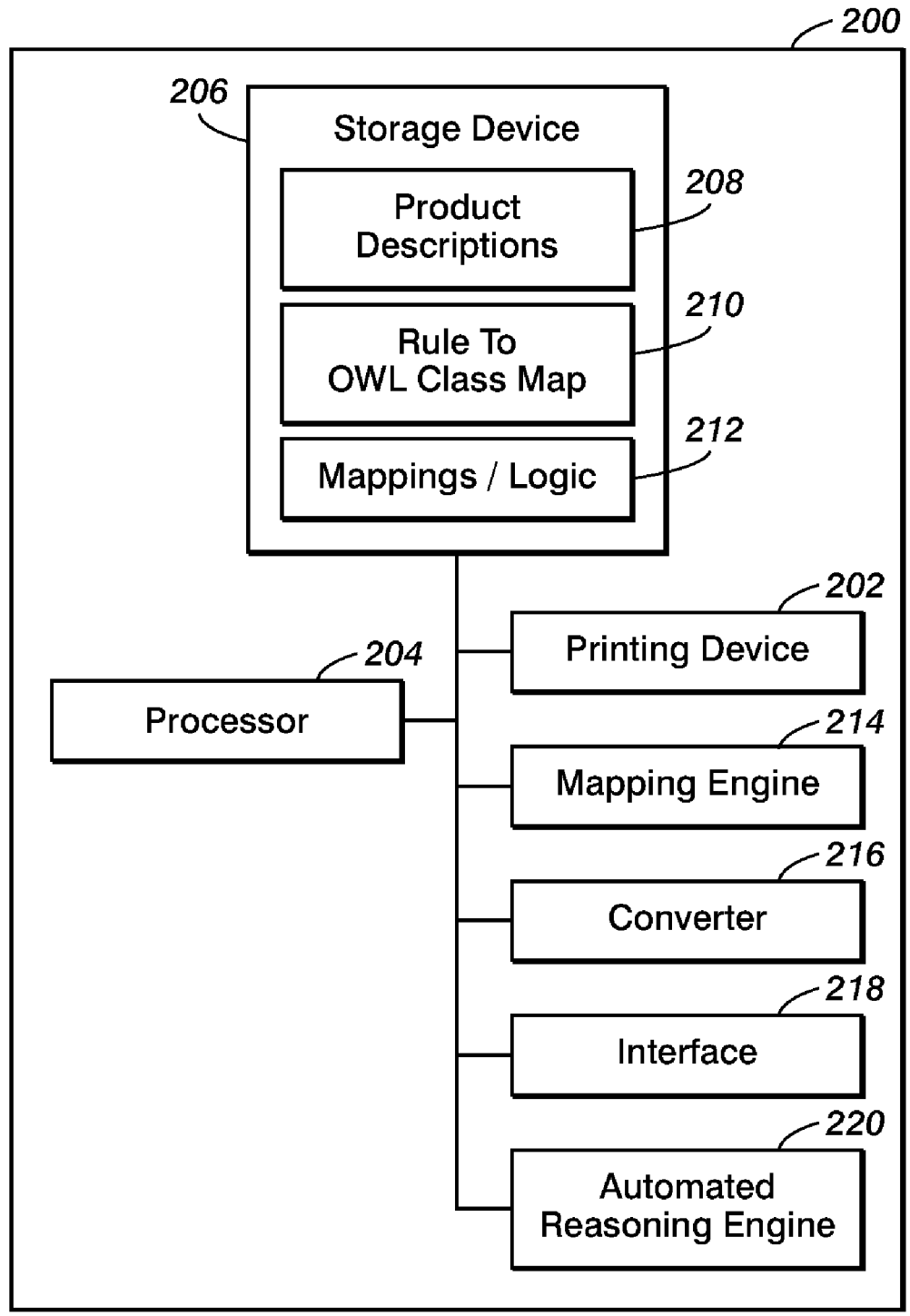
FIG. 2 is a flow diagram illustrating embodiments herein.

Such a system 200 shown in FIG. 2 can include a processor 204 (and a printing device/engine 202, if it is a printing apparatus). Any such printing engine 202 is operatively connected to the processor 204 and the printing engine 202 is adapted to print markings on items. In addition, a computerized storage device 206 (tape, hard drive, electronic memory, etc.) is operatively connected to the processor 204 and adapted to maintain one or more print product descriptions 208. For a printing apparatus, the print product descriptions 208 comprise one or more printing rules, and each of the printing rules comprises one or more conditions to be satisfied, as well as a printing action to be taken by the printing engine 202 if the conditions are satisfied. A mapping engine 214 is also operatively connected to the processor 204. The mapping engine 214 is adapted to construct the map 210 between the sub-conditions and constructs in a Web Ontological Language (OWL).

Further, such an apparatus includes a converter 216 adapted to convert the printing rules into new OWL classes. Thus, the converter 216 performs the conversion process mentioned above that, for a printing apparatus, includes creating a new OWL class for each corresponding printing rule; adding the new OWL class to the OWL ontology; for each condition of the corresponding printing rule, extracting sub-conditions; for each the sub-condition extracted, creating new constructs for the new OWL class using the map; and adding new class restrictions to the new OWL class, wherein each of the new class restrictions relates to a corresponding condition of the corresponding printing rule. The creating of the new constructs can be further based on additional logic and additional mappings 212 maintained within the computerized storage device 206.

The apparatus also includes an interface 218 (which can be any type of input/output, including a graphic user interface (GUI), data port, network connection, etc.) operatively connected to the processor 204. The interface 218 is adapted to receive instructions to initiate operations of the mapping engine 214 and the converter 216, and to output the new OWL classes.

In addition, the apparatus can include an automated reasoning engine 220 (also operatively connected to the processor 204). After the converter 216 converts the printing rules to the OWL classes, the automated reasoning engine 220 is adapted to perform automated reasoning on the new OWL classes to identify (and output to the interface 218 or processor 204) relationships between the new OWL classes and corresponding relationships between the printing rules.

Many computerized devices are discussed above. Computerized devices that include chip-based central processing units (CPU's), input/output devices (including graphic user interfaces (GUI), memories, comparators, processors, etc., are well-known and readily available devices produced by manufactures such as International Business Machines Corporation, Armonk N.Y., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein.

One exemplary rule-base and rules engine that can be used is "Drools." Drools is a business rule management system (BRMS) and an enhanced Rules Engine implementation, ReteOO, based on Charles Forgy's Rete algorithm tailored for the Java language available from Red Hat Corporation, Raleigh, N.C., USA. Drools is a forward-chaining production system (rules engine). Each rule has a set of conditions and an action. If all of the conditions for a given rule are true relative to an asserted facts base (called the working memory), and the rule has been placed on the agenda by the rules engine, then the rule may fire, executing the action of the rule.

A rule in a forward chaining production system includes a set of conditions. Conditions are essentially functions that evaluate to true or false based on the current state of the working memory of the rules engine. Further, conditions are predicate calculus expressions (a.k.a. sentences in the predicate calculus), meaning they can be created by combining logical expressions with the connectives AND, OR and NOT. Some examples include:

Condition1=(Binding is Side Stitched) OR (Binding is Corner Stitched);

Condition2=(Binding is Saddle Stitched) AND (Reader Page Count<=48);

Condition3=(Finished Dimension are 3.5"×2").

For purposes herein, the term "sub-condition" means the individual "expressions" of a given condition that are combined using the connectives AND, OR and NOT. An example includes:

Condition1=SubCondition1 OR SubCondition2;

Where, SubCondition1=(Binding is Side Stitched) and SubCondition2=(Binding is Corner Stitched).

In order for a rule to fire, at a minimum all of its conditions must evaluate to true. Some examples include:

Condition1=(Binding is Side Stitched) OR (Binding is Corner Stitched);

and

Condition2=(Reader Page Count<=125).

A rule with these two conditions can only fire when:

(((Binding is Side Stitched) OR (Binding is Corner Stitched)) AND (Reader Page Count<=125))

Since each condition of a rule and the conjunction of all the conditions of a rule are sentences in predicate calculus, and since OWL class restrictions are sentences in first-order predicate calculus it is possible to define a map from the one set of sentences to the other.

An example includes:

Condition1=(Binding is Side Stitched) OR (Binding is Corner Stitched).

This can be mapped to OWL with no loss of expressivity as follows:

Restriction1=(hasBinding value SideStitched) or (hasBinding value CornerStitched).

OWL class restrictions in this context represent the necessary and sufficient conditions for fully defining an OWL class which provide for the basis for an automated reasoner to make new and interesting logic-based inferences on the asserted knowledge-base.

For the purposes of the embodiments herein, only the conditions of a rule are considered. The idea of treating the conditions of a rule as logical restrictions which define a taxonomy for the rule-base naturally follows from the fact that the conditions of a rule are by definition sentences in predicate calculus, and the class restrictions of a defined OWL class are by definition sentences in first-order predicate calculus. However, the actions of a rule are not, in general, easily reduced to sentences in predicate calculus, so a mapping of rule actions is performed by the mapper 214. The mapper can be manually created or created with an automated program and can be updated/modified regularly. When defining the sub-condition to OWL construct map 210 between expressions in the sub-conditions of the rules and OWL constructs, the map should preserve the semantic meaning of the original sub-condition. An example follows:

Map$_i$: Sub-Condition→{OWL constructs}

Map$_1$: "Binding is X"→{Binding class, hasBinding object property, X an individual of Binding class}

Map$_2$: "Pages<=Y"→(hasPages data type property, integer, lessThanEqualTo(Y))

Where lessThanEqualTo(Y) represents the numeric restriction to place on the data type property (e.g., "hasPages only integer [<Y]."

The map 210 between expressions in sub-conditions and OWL constructs need not be done manually. It can be automatically created using automated means such as semantic parsing, pattern matching, heuristic or rule-based approaches to define the map.

An example of the conversion process 104 performed by the converter 216 is based on converting Intent2Process Classification Rules to OWL. Starting with the following subset of the Intent2Process classification rules:

rule "Booklet"
when
The Product Binding is "SaddleStitched"
then
The Product classification is called "Booklet"
end
rule "BusinessCard"
when
The Product Binding is "LooseBinding"
(The Product Width is "3.5") AND (The Product Height is "2")
The Product has fewer than "3" pages
then
The Product classification is called "BusinessCard"
end
rule "GenericCard"
when
The Product Binding is "LooseBinding"
The Product Height is between "0" and "4"
The Product Width is between "0" and "4"
The Product has fewer than "3" pages
then
The Product classification is called "GenericCard"
end
rule "JustPages"
when
The Product Binding is "LooseBinding"
then
The Product classification is called "JustPages"
end The conversion process defines the sub-condition to OWL construct map (step 102) using the following table.

TABLE 1

Sub-Condition to OWL Construct Map

| Sub-condition expression | OWL Construct |
|---|---|
| The Product Binding is "X" | → An object property hasBinding with a domain of ProductType and a range of Binding<br>A class named Binding<br>An individual of the Binding class named X |
| The Product Width is "Width" | → A data type property hasWidth of type float |
| The Product Height is "Height" | → A data type property hasHeight of type float |
| The Product has fewer than "X" pages | → A data type property hasPages of type integer |
| The Product Height is between "Min" and "Max" | → A data type property hasHeight of type float |
| The Product Width is between "Min" and "Max" | A data type property hasWidth of type float |

Further, the process defines a second mapping to transform the rule conditions to OWL based on the following table.

TABLE 2

Sub-Condition to OWL Restrictions Map

| Sub-condition expression | OWL Construct |
|---|---|
| The Product Binding is "X" | → hasBinding value X |
| The Product Width is "Width" | → hasWidth only float[>= Width, <= Width] |
| The Product Height is "Height" | → hasHeight only float[>= Height, <= Height] |
| The Product has fewer than "X" pages | → hasPages only integer[< X] |
| The Product Height is between "Min" and "Max" | → hasHeight only float[>= Min, <= Max] |
| The Product Width is between "Min" and "Max" | hasWidth only float[>= Min, <= Max] |

For presentation purposes this example creates an OWL class (step 150) called ProductType which will be the super class of all the OWL classes below. More specifically, this process creates an OWL class for each rule such that:

1. The name of the new OWL class is derived from the action of the rule. Specifically, since all the actions are of the form: the product classification is called "SomeProduct-Type," the name of the new OWL class is "SomeProduct-Type."

2. The new OWL class is a subclass of ProductType

Figure 3:
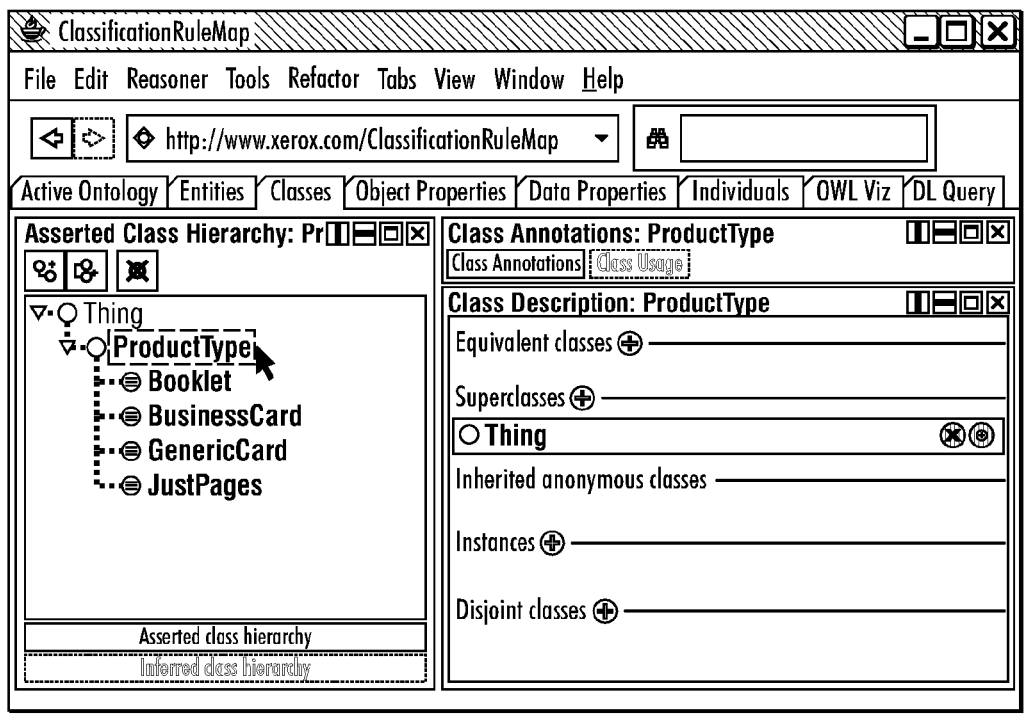
FIGS. 3-7 are screen shots illustrating newly added constructs according to embodiments herein.

The class hierarchy of the OWL ontology visualized using Protégé is shown in FIG. 3. Thus, FIG. 3 illustrates an exemplary screen shot of an OWL class hierarchy.

For each condition of the rule, item 154 extracts the sub-conditions 134. For each sub-condition the method uses the sub-condition to OWL construct map 210 to add the OWL constructs to the OWL ontology. Note that the constructs are only added once.

Figure 4:
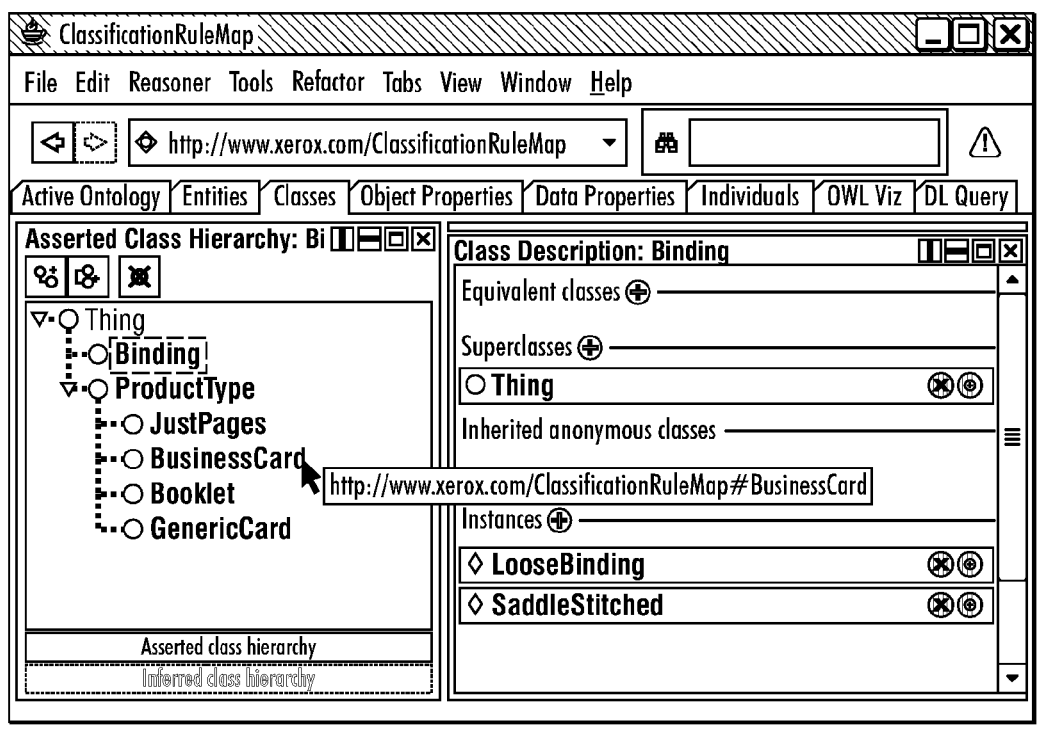
Figure 5:
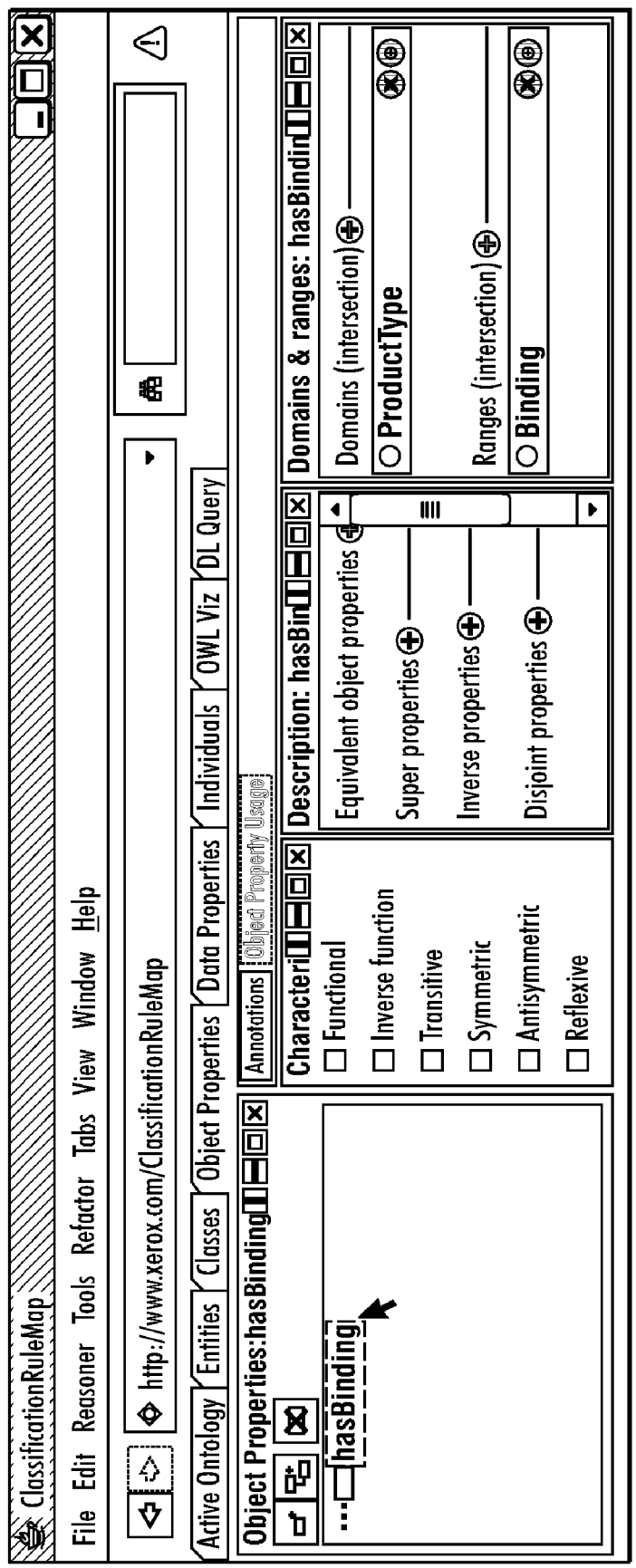
Figure 6:
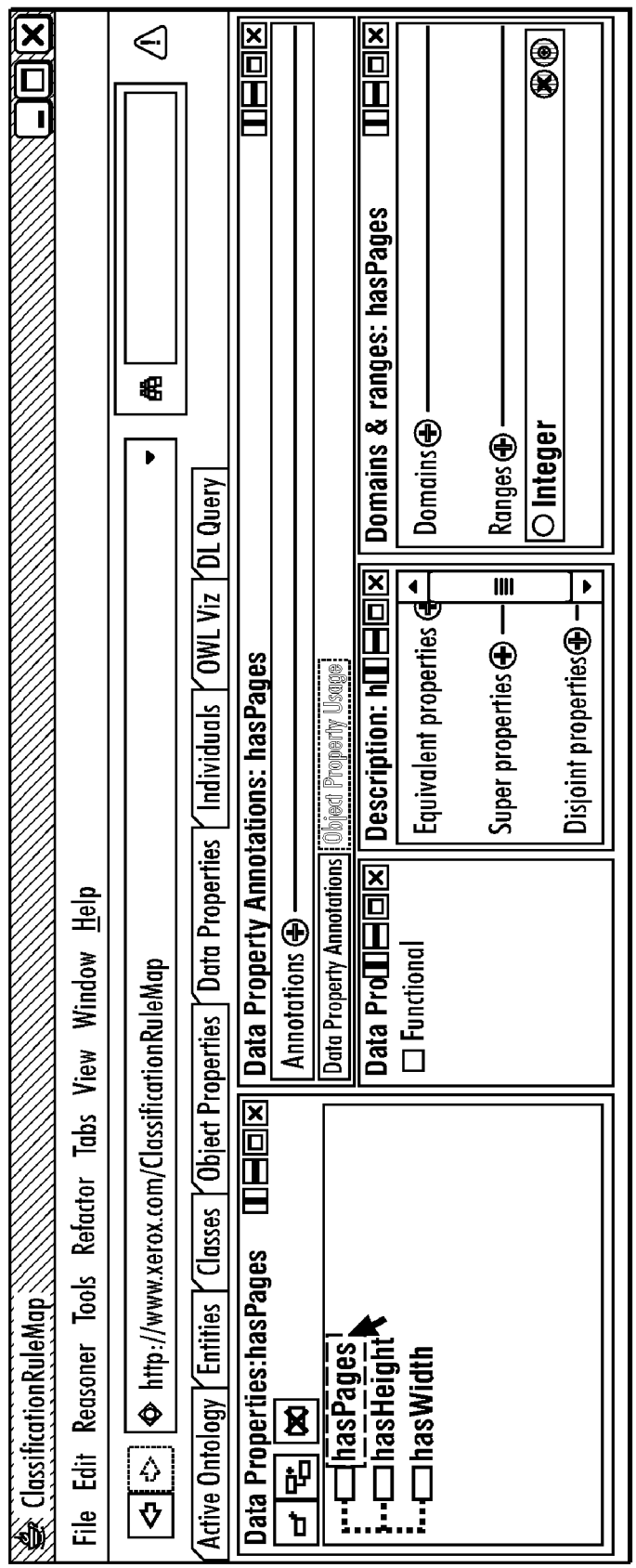

Examples of the OWL ontology with the newly added constructs visualized using Protégé are shown in FIGS. 4-7. More specifically, FIG. 4 is a screen shot illustrating OWL class hierarchy (constructed in items 150-154, of the conversion procedure 104). FIG. 5 is a screen shot illustrating OWL object properties (constructed in item 154 of the conversion procedure 104). FIG. 6 is a screen shot illustrating OWL data type properties (constructed in item 154 of the conversion procedure 104).

The methods herein define the OWL class with restrictions (item 158) using the sub-condition to OWL restrictions map defined in Table 2. The following table shows the results of this step.

TABLE 3

OWL class restrictions (constructed in step 158 of the conversion procedure 104)

| OWL Class | Equivalent Classes |
|---|---|
| JustPages | hasBinding value LooseBinding |
| Booklet | hasBinding value SaddleStiched |
| BusinessCard | hasHeight only float[>=2, <=2] and hasWidth only float[>=3.5, <=3.5] and hasBinding value LooseBinding and hasPages only integer[<3] |
| GenericCard | hasHeight only float[>0, <=4] and hasWidth only float[>0, <=4] and hasBinding value LooseBinding and hasPages only integer[<3] |

Figure 7:
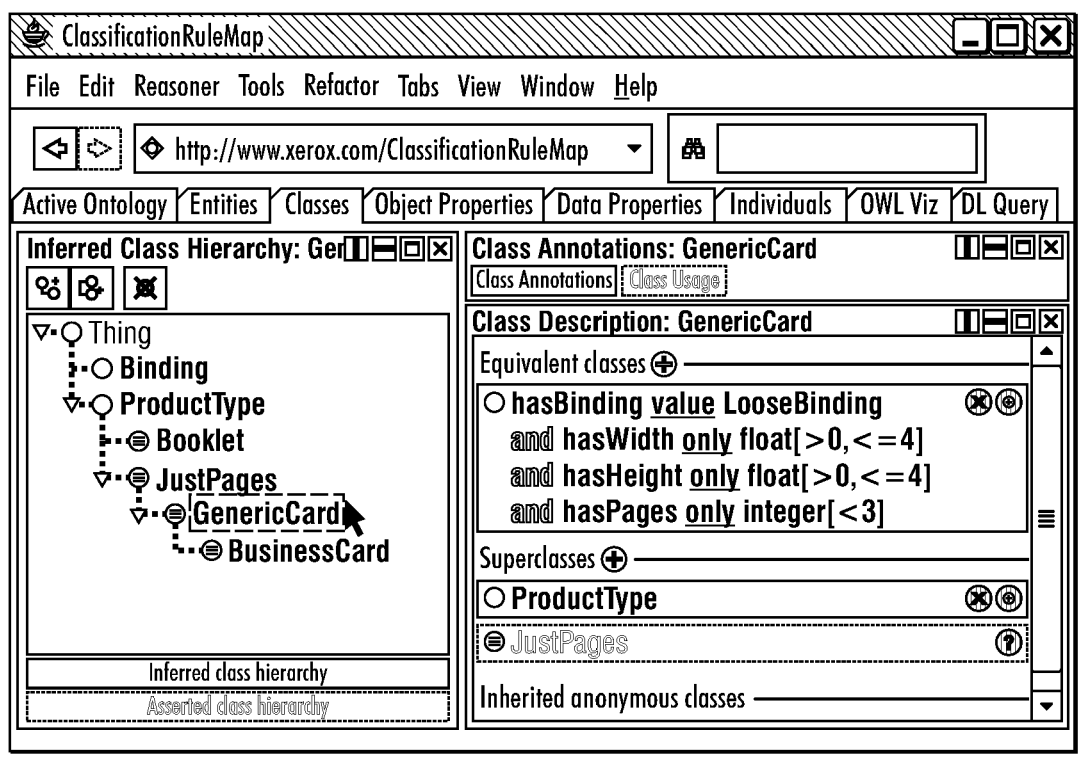

At this point the method described has converted the rules into an OWL ontology. As shown in item 108, automated reasoning can be performed using any reasoner, such as the open-source reasoner Pellet (discussed above), to determine the inferred class hierarchy. FIG. 7 is a screen shot illustrating a reasoner that infers that GenericCard is a subclass of JustPages Notice in the Protégé screen shot in FIG. 7 the fact that GenericCard is a subclass of JustPages. This unexpected classification is an error because the JustPages product type is intended to be of a size that can be printed on standard media sizes such as 8.5×11, 17×11, etc . . . , and a GenericCard is intended to be of a size that requires multi-up imposition before it can be printed on standard media sizes such as 8.5×11 and 17×11. Because of the relationships generated in step 110, this would allow a domain expert to recognize that the JustPages rule in the original rule-base is missing conditions for specifying standard media sizes.

The embodiments herein are not constrained to classification systems but are applicable to rule-bases that model many different domains. The embodiments herein produce non-obvious relationships between rules in a rule-base and provide a way for the Intent2Process technology to check rule bases modified in the field in an automated way. In addition, the embodiments herein provide automated support for identification of missing rule conditions.

All foregoing embodiments are specifically applicable to electrostatographic and/or xerographic machines and/or processes as well as to software programs stored on the electronic memory (computer usable data carrier) and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A computer-implemented method comprising:
providing one or more product type descriptions to a computerized device, wherein each of said product type descriptions comprise one or more rules, wherein each of said rules comprises one or more conditions to be satisfied and an action to be taken if said conditions are satisfied, wherein said each of said conditions comprises one or more sub-conditions;

automatically constructing a map between constructs and said sub-conditions in a Web Ontological Language (OWL) using said computerized device, wherein said OWL comprises an ontology, wherein said ontology comprises one or more classes corresponding to said rules, wherein each of said classes comprises one or more class restrictions corresponding to said conditions, wherein each of said class restrictions comprises one or more of said constructs corresponding to said sub-conditions;

automatically converting said rules into new OWL classes using said computerized device in a process comprising:
creating a new OWL class for each corresponding rule;
adding said new OWL class to said OWL ontology;
for each condition of said corresponding rule, extracting sub-conditions;
for each said sub-condition extracted, creating new constructs for said new OWL class using said map; and
adding new class restrictions to said new OWL class, wherein each of said new class restrictions relates to a corresponding condition of said corresponding rule; and outputting said new OWL classes from said computerized device; wherein
said adding of said new class restrictions comprises, for each given condition, creating a conjunction of all said new constructs associated with sub-conditions of said given condition, such that said conjunction of all said constructions forms a new class restriction corresponding to said given condition.

2. The method according to claim 1, wherein said creating of said new constructs is further based on additional logic and additional mappings.

3. The method according to claim 1, further comprising after said converting of said rules to said OWL, performing automated reasoning on said new OWL classes to identify relationships between said new OWL classes and corresponding relationships between said rules.

4. The method according to claim 1, wherein said conditions comprise functions that evaluate to true or false.

5. A computer-implemented method comprising:
providing one or more print product type descriptions to a computerized device, wherein each of said print product type descriptions comprise one or more product type classification rules, wherein each of said product type classification rules comprises one or more conditions to be satisfied and a classification action to be taken if said conditions are satisfied, wherein said each of said conditions comprises one or more sub-conditions;
automatically constructing a map between constructs and said sub—in a Web Ontological Language (OWL) using said computerized device, wherein said OWL comprises an ontology, wherein said ontology comprises one or more classes corresponding to said product type classification rules, wherein each of said classes comprises one or more class restrictions corresponding to said conditions, wherein each of said class restrictions comprises one or more of said constructs corresponding to said sub-conditions; and
automatically converting said printing rules into new OWL classes using said computerized device in a process comprising:
creating a new OWL class for each corresponding product type classification rule;
adding said new OWL class to said OWL ontology;
for each condition of said corresponding product type classification rule, extracting sub-conditions;
for each said sub-condition extracted, creating new constructs for said new OWL class using said map; and
adding new class restrictions to said new OWL class, wherein each of said new class restrictions relates to a corresponding condition of said corresponding product type classification rule; and outputting said new OWL classes from said computerized device; wherein
said adding of said new class restrictions comprises, for each given condition, creating a conjunction of all said new constructs associated with sub-conditions of said given condition, such that said conjunction of all said constructions forms a new class restriction corresponding to said given condition.

6. The method according to claim 5, wherein said creating of said new constructs is further based on additional logic and additional mappings.

7. The method according to claim 5, further comprising after said converting of said printing rules to said OWL, performing automated reasoning on said new OWL classes to identify relationships between said new OWL classes and corresponding relationships between said printing rules.

8. The method according to claim 5, wherein said conditions comprise functions that evaluate to true or false.

9. A system comprising:
a processor;
a computerized storage device operatively connected to said processor, wherein said storage device maintains one or more product type descriptions, wherein each of said product type descriptions comprise one or more rules, wherein each of said rules comprises one or more conditions to be satisfied and an action to be taken if said conditions are satisfied, wherein said each of said conditions comprises one or more sub-conditions;
a mapping engine operatively connected to said processor, wherein said mapping engine automatically constructs a map between constructs and said sub-conditions in a Web Ontological Language (OWL), wherein said OWL comprises an ontology, wherein said ontology comprises one or more classes corresponding to said rules, wherein each of said classes comprises one or more class restrictions corresponding to said conditions, wherein each of said class restrictions comprises one or more of said constructs corresponding to said sub-conditions;
a converter automatically converting said rules into new OWL classes in a process comprising:
creating a new OWL class for each corresponding rule;
adding said new OWL class to said OWL ontology;
for each condition of said corresponding rule, extracting sub-conditions;
for each said sub-condition extracted, creating new constructs for said new OWL class using said map; and
adding new class restrictions to said new OWL class, wherein each of said new class restrictions relates to a corresponding condition of said corresponding rule; and
an interface operatively connected to said processor, wherein said interface receives instructions to initiate operations of said mapping engine and said converter and to output said new OWL classes; wherein
said adding of said new class restrictions comprises, for each given condition, creating a conjunction of all said new constructs associated with sub-conditions of said given condition, such that said conjunction of all said constructions forms a new class restriction corresponding to said given condition.

10. The system according to claim 9, wherein said creating of said new constructs is further based on additional logic and additional mappings maintained within said computerized storage device.

11. The system according to claim 9, further comprising an automated reasoning engine operatively connected to said processor, wherein after said converting of said rules to said OWL, said automated reasoning engine is adapted to perform automated reasoning on said new OWL classes to identify relationships between said new OWL classes and corresponding relationships between said rules.

12. The system according to claim 9, wherein said conditions comprise functions that evaluate to true or false.

13. A printing apparatus comprising:
a processor;
a printing engine operatively connected to said processor, wherein said printing engine prints markings on items;
a computerized storage device operatively connected to said processor, wherein said storage device maintains one or more print product type descriptions, wherein each of said print product type descriptions comprise one or more product type classification rules, wherein each of said product type classification rules comprises one or more conditions to be satisfied and a product type classification action to be taken by said printing engine if said conditions are satisfied, wherein said each of said conditions comprises one or more sub-conditions;
a mapping engine operatively connected to said processor, wherein said mapping engine automatically constructs a map between constructs and said sub-conditions in a Web Ontological Language (OWL), wherein said OWL comprises an ontology, wherein said ontology comprises one or more classes corresponding to said product type classification rules, wherein each of said classes comprises one or more class restrictions corresponding to said conditions, wherein each of said class restrictions comprises one or more of said constructs corresponding to said sub-conditions;
a converter automatically converting said printing rules into new OWL classes in a process comprising:
creating a new OWL class for each corresponding product type classification rule;
adding said new OWL class to said OWL ontology;
for each condition of said corresponding product type classification rule, extracting sub-conditions;
for each said sub-condition extracted, creating new constructs for said new OWL class using said map; and
adding new class restrictions to said new OWL class, wherein each of said new class restrictions relates to a corresponding condition of said corresponding product type classification rule; and
an interface operatively connected to said processor, wherein said interface receives instructions to initiate operations of said mapping engine and said converter and to output said new OWL classes; wherein said adding of said new class restrictions comprises, for each given condition, creating a conjunction of all said new constructs associated with sub-conditions of said given condition, such that said conjunction of all said constructions forms a new class restriction corresponding to said given condition.

14. The printing apparatus according to claim 13, wherein said creating of said new constructs is further based on additional logic and additional mappings maintained within said computerized storage device.

15. The printing apparatus according to claim 13, further comprising an automated reasoning engine operatively connected to said processor, wherein after said converting of said product type classification rules to said OWL, said automated reasoning engine is adapted to perform automated reasoning on said new OWL classes to identify relationships between said new OWL classes and corresponding relationships between said product type classification rules.

16. The printing apparatus according to claim 13, wherein said conditions comprise functions that evaluate to true or false.

* * * * *